United States Patent
Kwon et al.

(10) Patent No.: US 9,927,871 B2
(45) Date of Patent: Mar. 27, 2018

(54) IMAGE PROCESSING METHOD, IMAGE PROCESSING CIRCUIT, AND DISPLAY DEVICE USING THE SAME

(71) Applicant: LG DISPLAY CO., LTD., Seoul (KR)

(72) Inventors: Su-Hyun Kwon, Daegu (KR); Jae-Hong Kim, Paju-si (KR); Hong-Seop Shin, Goyang-si (KR); Hee-Eun Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/217,439

(22) Filed: Jul. 22, 2016

(65) Prior Publication Data
US 2017/0024006 A1    Jan. 26, 2017

(30) Foreign Application Priority Data
Jul. 24, 2015  (KR) .................. 10-2015-0104744

(51) Int. Cl.
*G09G 5/00* (2006.01)
*G06F 3/01* (2006.01)
(Continued)

(52) U.S. Cl.
CPC ............... *G06F 3/013* (2013.01); *G06T 1/20* (2013.01); *G06T 1/60* (2013.01); *G06T 3/0093* (2013.01); *G06T 5/003* (2013.01); *G06T 7/13* (2017.01); *G09G 3/2003* (2013.01); *G06T 2207/20192* (2013.01); *G09G 3/3233* (2013.01); *G09G 3/3258* (2013.01); *G09G 2320/0261* (2013.01); *G09G 2340/06* (2013.01)

(58) Field of Classification Search
CPC ... G06F 3/013; G06T 7/13; G06T 1/20; G06T 5/003; G06T 3/0093; G06T 1/60; G06T 2207/20192; G09G 3/2003; G09G 2340/06; G09G 3/3233; G09G 2320/0261; G09G 3/3258
See application file for complete search history.

(56) References Cited

U.S. PATENT DOCUMENTS

| 5,896,469 A * | 4/1999 | Murakami | ............... G06T 5/004 382/162 |
| 7,268,916 B2 * | 9/2007 | Kokemohr | ............... G06T 5/004 358/1.2 |

(Continued)

*Primary Examiner* — Erin M File
(74) *Attorney, Agent, or Firm* — Birch, Stewart, Kolasch & Birch, LLP (57) ABSTRACT

An image processing method, an image processing circuit, and a display apparatus using the same are discussed. The image processing method can include sensing a viewing distance of a user and determining a predetermined viewing distance mode, upon determining that the viewing distance corresponds to a short distance mode, performing blurring processing on four-color data of each pixel of an input image for each color channel by applying a predetermined blurring mask to reduce data of an edge portion of the input image and to output the image, and upon determining that the viewing distance corresponds to a long distance mode, performing sharpening processing on white data of four-color data of each pixel of the input image by applying a predetermined sharpness mask to increase the white data of the edge portion of the input image and to output the image.

8 Claims, 9 Drawing Sheets

(51) Int. Cl.
*G09G 3/20* (2006.01)
*G06T 5/00* (2006.01)
*G06T 3/00* (2006.01)
*G06T 1/60* (2006.01)
*G06T 1/20* (2006.01)
*G06T 7/13* (2017.01)
G09G 3/3258 (2016.01)
G09G 3/3233 (2016.01)

(56) References Cited

U.S. PATENT DOCUMENTS

| | | | |
|---|---|---|---|
| 9,720,235 B2* | 8/2017 | Border | G02B 27/0172 |
| 2003/0189568 A1* | 10/2003 | Alkouh | G06T 15/50 |
| | | | 345/422 |
| 2012/0062551 A1* | 3/2012 | Lee | H04N 13/0018 |
| | | | 345/419 |
| 2012/0127128 A1* | 5/2012 | Large | G06F 3/0425 |
| | | | 345/175 |
| 2015/0312560 A1* | 10/2015 | Deering | G02B 13/0085 |
| | | | 345/1.3 |
| 2016/0018645 A1* | 1/2016 | Haddick | G06T 19/20 |
| | | | 345/8 |
| 2016/0343313 A1* | 11/2016 | Ji | G09G 3/36 |
| 2016/0358552 A1* | 12/2016 | Wang | G09F 9/301 |

* cited by examiner

$$\begin{array}{|c|c|c|}\hline Z & Y & Z \\\hline Y & X & Y \\\hline Z & Y & Z \\\hline\end{array}_{SM} \otimes \begin{array}{|c|c|c|}\hline W_{i-1,j-1} & W_{i,j-1} & W_{i+1,j-1} \\\hline W_{i-1,j} & W_{i,j} & W_{i+1,j-1} \\\hline W_{i-1,j+1} & W_{i,j+1} & W_{i+1,j+1} \\\hline\end{array} \div (3 \times 3) = W'_{i,j}$$

FIG. 8

$$Gain \times \begin{array}{|c|c|c|}\hline -N & -M & -N \\\hline -M & L & -M \\\hline -N & -M & -N \\\hline\end{array}_{SM} \otimes \begin{array}{|c|c|c|}\hline W_{i-1,j-1} & W_{i,j-1} & W_{i+1,j-1} \\\hline W_{i-1,j} & W_{i,j} & W_{i+1,j-1} \\\hline W_{i-1,j+1} & W_{i,j+1} & W_{i+1,j+1} \\\hline\end{array} + W_{i,j} = W''_{i,j}$$

IMAGE PROCESSING METHOD, IMAGE PROCESSING CIRCUIT, AND DISPLAY DEVICE USING THE SAME

CROSS-REFERENCE TO RELATED APPLICATIONS

This application claims the priority benefit of Korean Patent Application No. 10-2015-0104744, filed on Jul. 24, 2015, which is hereby incorporated by reference as if fully set forth herein.

BACKGROUND OF THE INVENTION

Field of the Invention

The present invention relates to a display apparatus, and more particularly, to an image processing method, an image processing circuit, and a display apparatus using the same, for providing optimum image quality to a viewer by adjusting sharpness according to image characteristics and a viewing distance.

Discussion of the Related Art

Representative examples of an image display apparatus include a liquid crystal display (LCD), an organic light emitting diode (OLED) display apparatus, and so on.

Recently, a transparent display apparatus has been developed along with the development of display apparatuses. Since the transparent display apparatus allows light to pass therethrough in both forward and backward directions, information can be displayed in both the directions and users who face each other across the display apparatus can also look over the transparent display apparatus.

The transparent display apparatus can be applied to various applied products such as a car window, a building window, an electronic display board, a cooler door, and a screen door and, thus, there are various user environments. In addition, a commercial transparent display apparatus includes a touch panel coupled thereto so as to increase a degree of freedom of a viewing distance to a proximity distance from a long distance.

Accordingly, when a user uses the transparent display apparatus at a proximity distance for a touch or the like, pixels are recognized, or when the user uses the apparatus at a long distance, sharpness of an image is degraded and, accordingly, there is a problem with degraded user perceptual quality.

Furthermore, the aforementioned problem can also occur in various display apparatuses as well as a transparent display apparatus and, thus, the present invention is not limited to a transparent display apparatus.

SUMMARY OF THE INVENTION

Accordingly, the present invention is directed to an image processing method, an image processing circuit, and a display apparatus using the same that substantially obviates one or more problems due to limitations and disadvantages of the related art.

An object of the present invention is to provide an image processing method, an image processing circuit, and a display apparatus using the same, for providing optimum image quality to a viewer by adjusting sharpness according to image characteristics and a viewing distance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an image processing method includes sensing a viewing distance of a user and determining a predetermined viewing distance mode, upon determining that the viewing distance corresponds to a short distance mode, performing blurring processing on four-color data of each pixel of an input image for each color channel by applying a predetermined blurring mask to reduce data of an edge portion of the input image and to output the image, and upon determining that the viewing distance corresponds to a long distance mode, performing sharpening processing on white data (W data) of four-color data of each pixel of the input image by applying a predetermined sharpness mask to increase the W data of the edge portion of the input image and to output the image.

The image processing may further include, prior to the performing of the blurring or sharpening processing, converting three-color data of each pixel of the input image into the four-color data and storing the four-color data in a memory in units of frames. The four-color data stored in the memory may be updated via the blurring processing and the image may be output or only the W data of the four-color data may be updated via the sharpness processing and the image may be output.

The image processing may further include, after the storing of the input image and prior to the performing of the blurring or sharpening processing, dividing the four-color data into a transmissive region and a non-transmissive region by performing predetermined image analysis on the four-color data stored in the memory. The performing of the blurring processing may include updating four-color data of the non-transmissive region via the blurring processing and outputting four-color data of the transmissive region and the updated four-color data of the non-transmissive region. The performing of the sharpening processing may include updating the W data of the four-color data of the non-transmissive region via the sharpening processing and outputting the four-color data of the transmissive region and the four-color data of the non-transmissive region containing the updated W data.

The image processing may further include, upon determining that the viewing distance corresponds an optimum distance mode, outputting the four-color data stored in the memory without the blurring processing or the sharpening processing.

In another aspect of the present invention, an image processing circuit for performing image processing according to a viewing distance of a user, sensed by an external viewing distance sensor includes a viewing distance determiner for determining a predetermined viewing distance mode according to the viewing distance sensed by the viewing distance sensor, a blurring filter for performing blurring processing on four-color data of each pixel of an input image for each color channel by applying a predetermined blurring mask to correct data of the an edge portion of the input image when the viewing distance determiner outputs a first control signal indicating a short distance mode, and a sharpness filter for performing sharpening processing on W data of four-color data of each pixel of the input image by applying a predetermined sharpness mask to correct the W data of the edge portion of the input image when the viewing distance determiner outputs a second control signal indicating a long distance mode.

The image processing circuit may further include a four-color converter for converting three-color data of each pixel of the input image into the four-color data, and a memory for storing the four-color data from the four-color converter in units of frames. The blurring filter may update the four-color data stored in the memory via the blurring processing in response to the first control signal from the viewing distance determiner and the sharpness filter may update only the W data of the four-color data stored in the memory in response to the second control signal from the viewing distance determiner.

The image processing circuit may further include a non-transmissive region detector connected between the memory, and the blurring filter and the sharpness filter and for dividing the four-color data stored in the memory into a transmissive region and a non-transmissive region by performing image analysis on the four-color data.

The non-transmissive region detector may provide four-color data of the non-transmissive region to the blurring filter in response to the first control signal from the viewing distance determiner and update corresponding four-color data of the memory with the four-color data of the non-transmissive region corrected by the blurring filter.

The non-transmissive region detector may provide W data of the four-color data of the non-transmissive region to the sharpness filter in response to the second control signal from the viewing distance determiner and updates corresponding W data of the memory with the W data of the non-transmissive region corrected by the sharpness filter.

Driving of the blurring filter and the sharpness filter may be turned off when the viewing distance determiner outputs a third control signal indicating an optimum distance mode.

Driving of the blurring filter, the sharpness filter, and the non-transmissive region detector may be turned off when the viewing distance determiner outputs a third control signal indicating an optimum distance mode.

In another aspect of the present invention, a display apparatus includes the aforementioned viewing distance sensor, the image processing circuit for selectively performing the blurring processing and the sharpening processing according to the viewing distance of the user, and a panel driver for driving a display panel to display four-color data output from the image processing circuit on the display panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
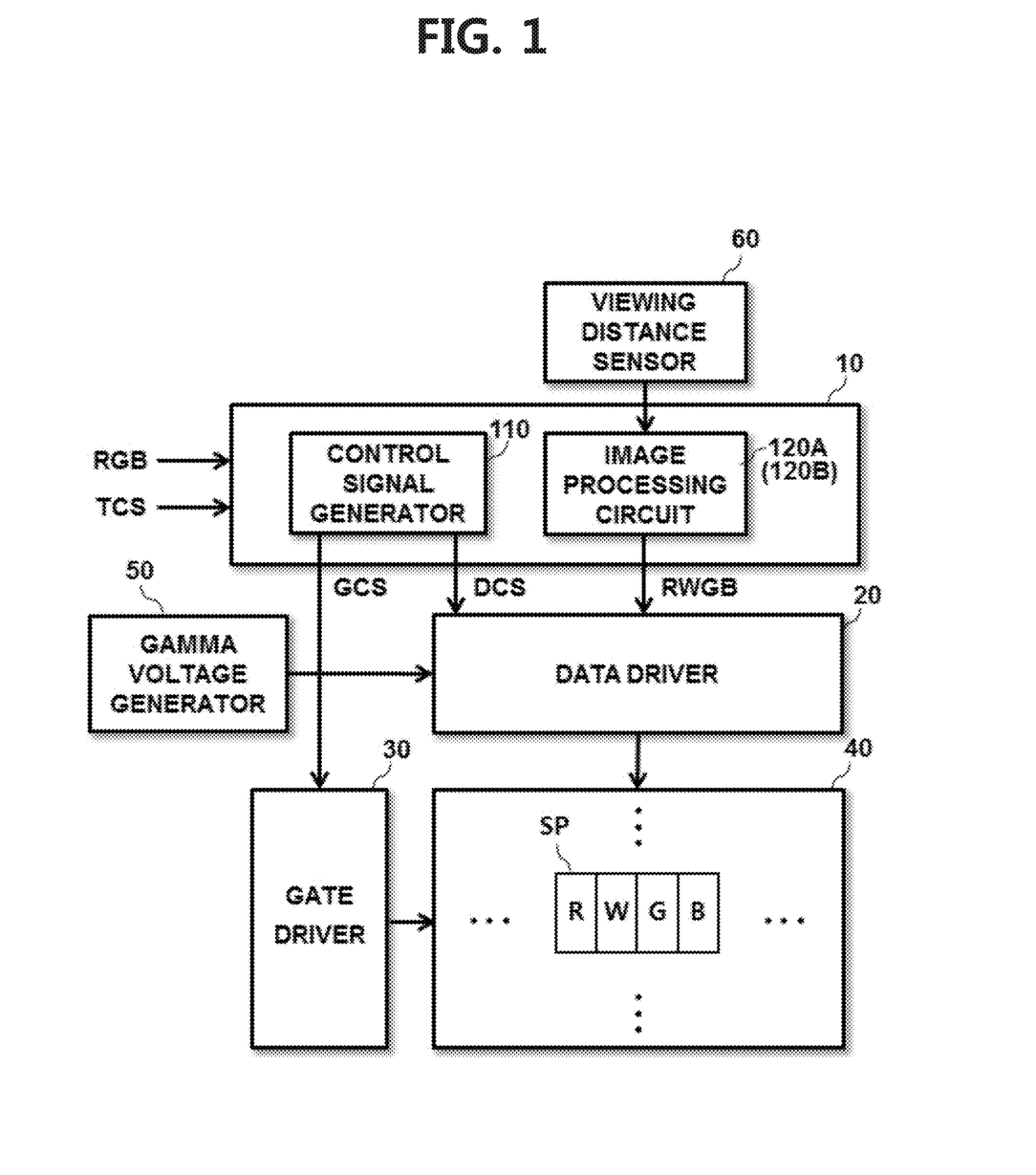
FIG. 1 is a schematic block diagram of a configuration of a display apparatus according to an embodiment of the present invention.
Figure 2:
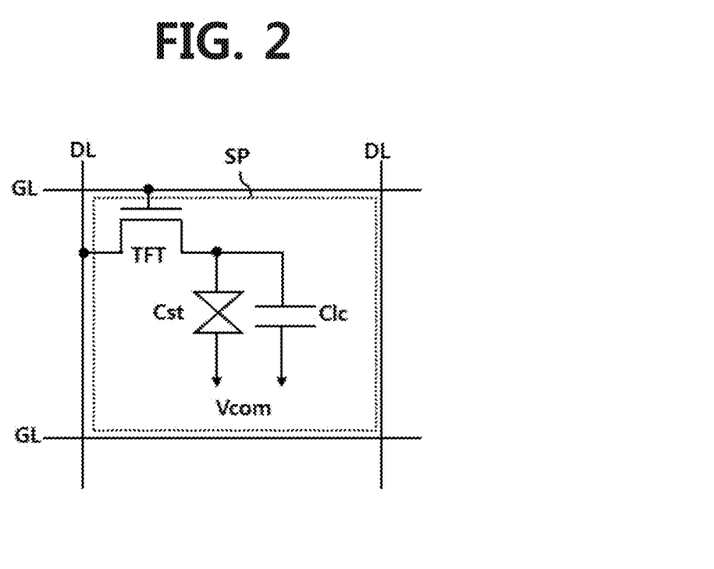
FIG. 2 is an equivalent circuit diagram of a configuration of a liquid crystal display (LCD) subpixel applied to a display panel of FIG. 1.
Figure 3:
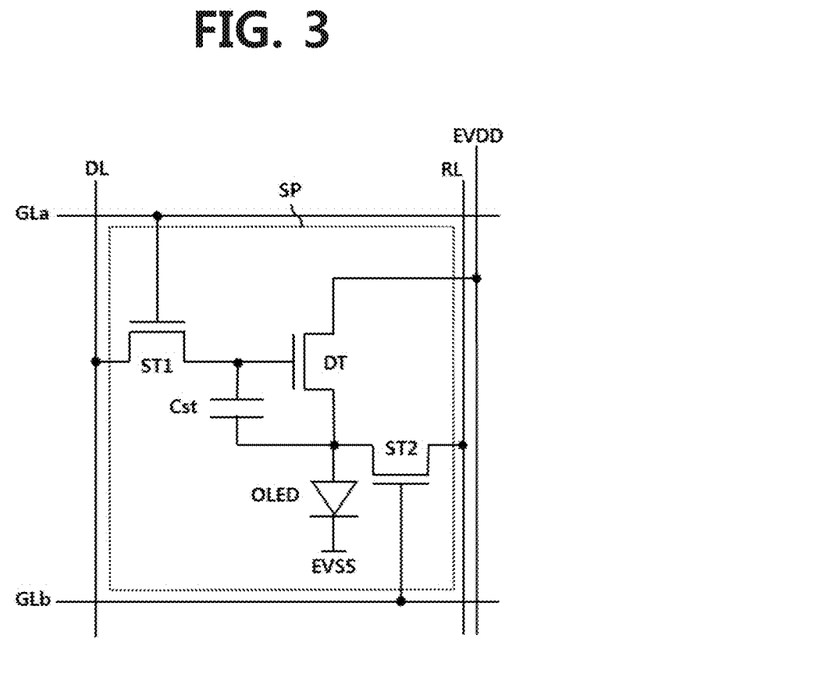
FIG. 3 is an equivalent circuit diagram of a configuration of an organic light emitting diode (OLED) subpixel applied to the display panel of FIG. 1.

FIG. 1 is a schematic block diagram of a configuration of a display apparatus according to an embodiment of the present invention. FIG. 2 is an equivalent circuit diagram of a configuration of a liquid crystal display (LCD) subpixel applied to a display panel 40 of FIG. 1. FIG. 3 is an equivalent circuit diagram of a configuration of an organic light emitting diode (OLED) subpixel applied to the display panel 40 of FIG. 1. All the components of the display apparatus according to all embodiments of the present invention are operatively coupled and configured.

The display apparatus of FIG. 1 may include a timing controller 10, a data driver 20 and a gate driver 30 as a panel driver, the display panel 40, a gamma voltage generator 50, a viewing distance sensor 60, and so on.

The display panel 40 may display an image through a pixel array in which pixels are arranged in the form of a matrix. Each pixel of the pixel array may include red (R), white (W), green (G), and blue (B) subpixels (SPs). As the display panel 40, a liquid crystal display (LCD) apparatus, an organic light emitting diode (OLED) display apparatus, an electrophoretic display apparatus (EPD), or the like.

For example, when the display panel 40 is an LCD panel, each subpixel may include a thin film transistor TFT connected to a gate line GL and a data line DL, and liquid crystal capacitor Clc and storage capacitor Cst that are connected in parallel to each other between the thin film transistor TFT and a common electrode, as illustrated in FIG. 2. The liquid crystal capacitor Clc may charge a difference voltage of a data signal supplied to a pixel electrode through the thin film transistor TFT with a common voltage Vcom applied to the common electrode and drive liquid crystal according to the charged voltage to control light transmission. The storage capacitor Cst may stably maintain a voltage charged in the liquid crystal capacitor Clc.

On the other hand, when the display panel 40 is an OLED panel, each subpixel SP may include a pixel circuit including an OLED device connected between a high-voltage power EVDD line and a low-voltage power EVSS line, first and second switching TFTs ST1 and ST2 and a driving TFT DT for independently driving the OLED device, and a storage capacitor Cst, as illustrated in FIG. 3, and the pixel circuit may have various configurations and may not be limited to the configuration of FIG. 3.

The OLED device may include an anode connected to the driving TFT DT, a cathode connected to the low-voltage power EVSS, and a light emitting layer between the anode and the cathode and generates light that is proportional to the amount of current supplied from the driving TFT DT.

The first switching TFT ST1 may be driven by a gate signal of one gate line GLa to supply a data voltage from a corresponding data line DL to a gate node of the driving TFT DT and the second switching TFT ST2 may be driven by a gate signal of another gate line GLb to supply a reference voltage from a reference line RL to a source node of the driving TFT DT. The second switching TFT ST2 may be further used as a path for outputting current from the driving TFT DT to the reference line RL in a sensing mode.

The storage capacitor Cst connected between the gate node and the source node of the driving TFT DT may charge a difference voltage between the data voltage supplied to the gate node through the first switching TFT ST1 and the reference voltage supplied to the source node through the second switching TFT ST2 to supply a driving voltage of the driving TFT DT.

The driving TFT DT may control current supplied from the high-voltage power EVDD according to the driving voltage from the storage capacitor Cst so as to supply current proportional to the driving voltage to the OLED device to light up the OLED device.

The data driver 20 may receive data control signal DCS and four-color data RWGB from the timing controller 10. The data driver 20 may be driven according to the data control signal DCS to subdivide a reference gamma voltage set supplied from the gamma voltage generator 50 to gray scale voltages that respectively correspond to gray scales of data, to convert digital four-color data RWGB into analog data signals using the subdivided gray scale voltages and, then, to supply the analog data signals to data lines of the display panel 40, respectively.

The data driver 20 may include a plurality of data drive ICs for separately driving the data lines of the display panel 40. Each data drive IC may be mounted on a circuit film such as a tape carrier package (TCP), a chip on film (COF), and a flexible print circuit (FPC) and may be attached to the display panel 40 via a tape automatic bonding (TAB) method or may be mounted on the display panel 40 via a chip on glass (COG) method.

The gate driver 30 may drive each of a plurality of gate lines of the display panel 40 using a gate control signal GCS supplied from the timing controller 10. The gate driver 30 may supply a scan pulse of a gate-on voltage to each gate line during a corresponding scan period in response to a gate control signal and supply a gate-off voltage during the remaining period. The gate driver 30 may receive the gate control signal GCS from the timing controller 10 or receive gate control signal GCS from the timing controller 10 through the data driver 20. The gate driver 30 may include at least one gate IC and may be mounted on a circuit film such as TCP, COF, and FPC and may be attached to the display panel 40 via a TAB method or may be mounted on the display panel 40 via a COG method. On the other hand, the gate driver 30 may be formed on a TFT substrate together with a TFT array included in the pixel array of the display panel 40 so as to be configured as a gate in panel (GIP) type-gate driver which is installed in a non-display region of the display panel 40.

The viewing distance sensor 60 may sense a viewing distance as a distance between the display panel 40 and a viewer using a general distance sensor and output the sensed viewing distance information to the timing controller 10.

The timing controller 10 may receive image data R, G, and B and a timing signal TCS from an external host system. For example, the external host system may be any one of portable terminals such as a computer, a TV system, a set-top box, a tablet PC, or a cellular phone.

The timing controller 10 may control each of the data driver 20 and the gate driver 30 using input timing signals TCS, may convert input three-color data R, G, and B into four-color data R, W, G, and B, may selectively perform blurring processing or sharpening processing on the four-color data R, W, G, and B according to image characteristics and viewing distance information, and may output the processed data to the data driver 20.

To this end, the timing controller 10 may include a control signal generator 110 and an image processing circuit 120A or 120B. The image processing circuit 120A or 120B may be separated from the timing controller 10 to constitute a separate IC and may be positioned at a previous end of the timing controller 10.

The control signal generator 110 may generate a data control signal DCS and a gate control signal GCS using the input timing signals TCS and output the data control signal DCS and the gate control signal GCS to the data driver 20 and the gate driver 30, respectively. The timing signal TCS received by the control signal generator 110 may include a dot clock, a data enable signal, a vertical synchronization signal, and a horizontal synchronization signal, but the vertical synchronization signal and the horizontal synchronization signal may be omitted. When the vertical synchronization signal and the horizontal synchronization signal are omitted, the control signal generator 110 may count the data enable signal according to the dot clock and generate and use the vertical synchronization signal and the horizontal synchronization signal. The data control signals DCS may include a source start pulse, a source sampling clock, a polarity control signal, a source output enable signal, and so on, for control of driving of the data driver 20. The gate control signals GCS may include a gate start pulse, a gate shift clock, a gate output enable signal, and so on, for control of driving of the gate driver 30.

The image processing circuit 120A according to a first embodiment of the present invention may convert three-color data R, G, and B into four-color data R, W, G, and B using a general RGB-to-WRGB conversion method and perform different image processing operations, i.e., blurring processing or sharpening processing on the four-color data R, W, G, and B according to viewing distance information supplied from the viewing distance sensor 60 so as to adjust sharpness according to a viewing distance and to output an image. The image processing circuit 120A may apply blurring processing to all of the four-color data R, W, G, and B and apply sharpening processing only to the data W of the four-color data R, W, G, and B. The data W is also referred to herein as W data.

On the other hand, the image processing circuit 120A may apply blurring processing only to the data W of the four-color data R, W, G, and B or apply sharpening processing to all of the four-color data R, W, G, and B.

Compared with the aforementioned image processing circuit 120A according to the first embodiment of the present invention, the image processing circuit 120B according to a second embodiment of the present invention applied to a transparent display apparatus may apply a technology of dividing image data into a transmissive region and a non-transmissive region via image analysis and then adjusting sharpness according to the aforementioned viewing distance only to data of the non-transmissive region. The image processing circuit 120B according to the second embodiment of the present invention may output data of the transmissive region without adjustment of sharpness so as to prevent transmittance of the transmissive region from being reduced due to unnecessary image processing. The image processing circuit 120B according to the second embodiment may perform image analysis for division into the transmissive region and the non-transmissive region only when sharpness needs to be adjusted.

In addition, the image processing circuit 120A or 120B may further perform necessary image processing such as power consumption reduction, image compensation, and degradation compensation and then output the image to the data driver 20.

Figure 4A:
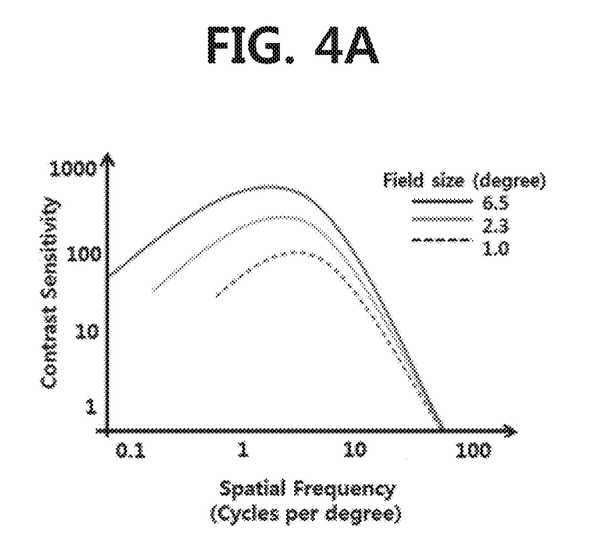
FIGS. 4A and 4B are graphs showing contrast sensitivity characteristics and sharpness recognition characteristics according to a viewing distance.
Figure 4B:
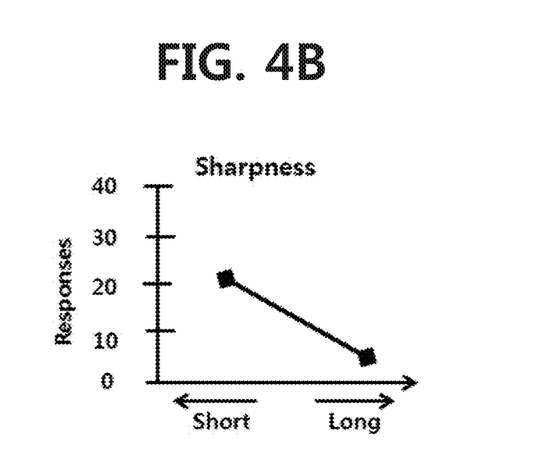

FIGS. 4A and 4B are graphs showing contrast sensitivity characteristics and sharpness recognition characteristics according to a viewing distance.

As seen from FIG. 4A, as a viewing distance of a display apparatus is reduced (as a viewing angle is increased), contrast sensitivity characteristics is increased and a peak frequency of a spatial frequency is reduced. As seen from FIG. 4B, as a viewing distance is increased, sharpness recognition characteristics are reduced. In consideration of the contrast sensitivity characteristics and sharpness recognition characteristics, the image processing circuit 120A or 120B may be differently adjust sharpness according to a viewing distance.

Figure 5:
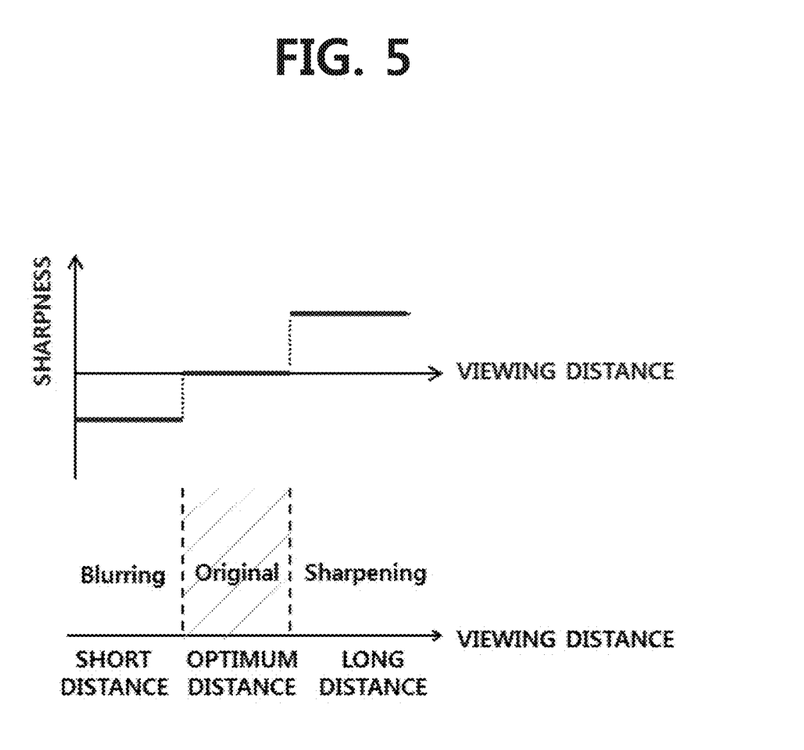
FIG. 5 is a schematic diagram of a concept of an image processing method according to a viewing distance according to an embodiment of the present invention.

FIG. 5 is a schematic diagram of a concept of an image processing method according to a viewing distance according to an embodiment of the present invention.

Referring to FIG. 5, when viewing distance information corresponds to a short distance mode, the image processing circuit 120A or 120B may perform blurring processing on image data so as to reduce edge brightness to reduce sharpness, and when viewing distance information corresponds to a long distance mode, the image processing circuit 120A or 120B may perform sharpening processing on the image data so as to increase edge brightness to increase sharpness.

Accordingly, a pixel recognition degree when a viewer views an image at a short distance may be reduced, visibility of an object positioned behind a transparent display apparatus may be enhanced, and a sharp image may be provided when the viewer views an image at a long distance so as to provide optimum recognized image quality to a user. The image processing circuit 120A or 120B may output image data without blurring or sharpening processing when the viewing distance information corresponds to an optimum distance mode.

Figure 6:
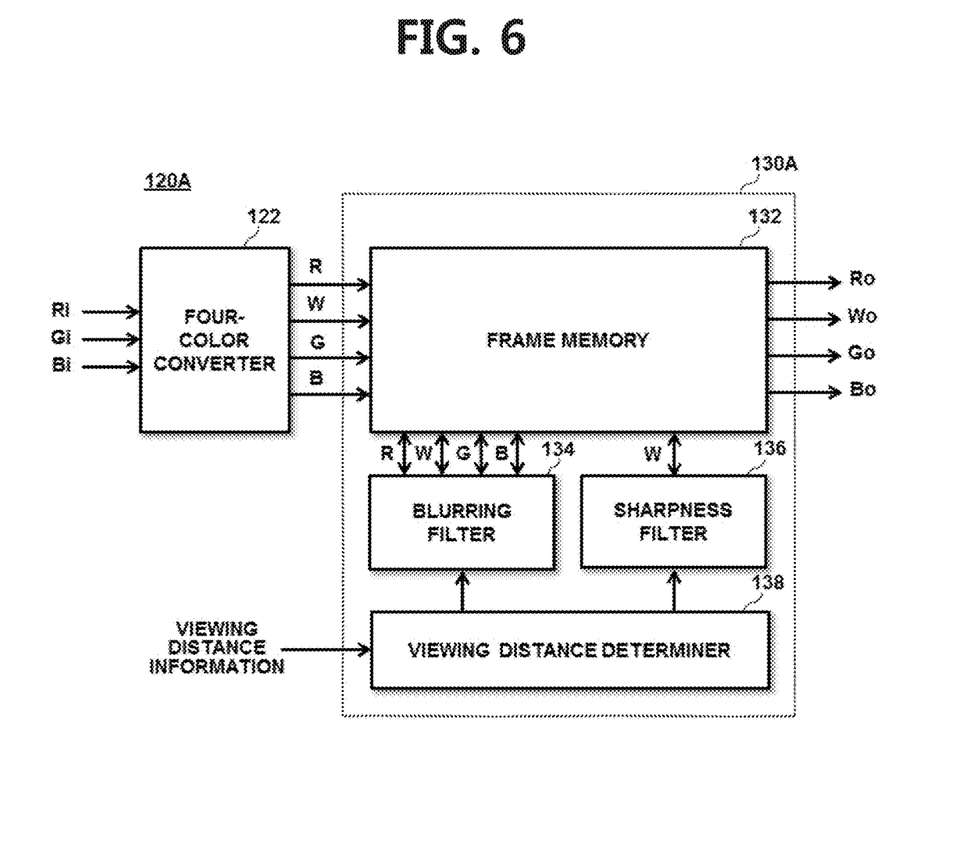
FIG. 6 is a block diagram illustrating an internal structure of the image processing circuit according to a first embodiment of the present invention.

FIG. 6 is a block diagram illustrating an internal structure of the image processing circuit 120A according to a first embodiment of the present invention.

The image processing circuit 120A illustrated in FIG. 6 may include a four-color converter 122 for converting three-color data Ri, Gi, and Bi into four-color data R, W, G, and B and outputting the four-color data R, W, G, and B, and a sharpness adjuster 130A for performing blurring processing or sharpening processing on the four-color data R, W, G, and B from the four-color converter 122 according to viewing distance information from the viewing distance sensor 60 (refer to FIG. 1) and outputting the image or outputting the image without image correction.

The image processing circuit 120A may further include an inverse gamma corrector at an input end and may further include a gamma corrector at an output end. The inverse gamma corrector may linearize the input three-color data R, G, and B via de-gamma correction and transmit the linearized three-color data Ri, Gi, and Bi to the four-color converter 122, and the four-color converter 122 may convert the linearized three-color data Ri, Gi, and Bi into four-color data R, W, G, and B. The gamma corrector may non-linearize four-color data Ro, Wo, Go, and Bo, sharpness of which is selectively adjusted according to viewing distance information by the sharpness adjuster 130A, via gamma correction and transmit the non-linearized four-color data to the data driver 20.

The four-color converter 122 may convert the three-color data Ri, Gi, and Bi into four-color data R, W, G, and B using a general RGB-to-WRGB conversion technology and output the four-color data R, W, G, and B to the sharpness adjuster 130A. For example, the four-color converter 122 may set a minimum value of the input three-color data Ri, Gi, and Bi as data W and subtract the data W from each of the three-color data Ri, Gi, and Bi so as to convert the three-color data Ri, Gi, and Bi into four-color data R, W, G, and B. A RGB-to-WRGB conversion method of the four-color converter 122 is not limited to the aforementioned method and, thus, may use any one of various known RGB-to-WRGB conversion methods.

The sharpness adjuster 130A may include a frame memory 132 for storing four-color data R, W, G, and B from the four-color converter 122, a viewing distance determiner 138 for selectively driving a blurring filter 134 and a sharpness filter 136 according to the viewing distance information from the viewing distance sensor 60 (refer to FIG. 1), the blurring filter 134 for performing blurring processing on four-color data R, W, G, and B of the frame memory 132 in response to a first control signal from the viewing distance determiner 138, and the sharpness filter 136 for performing sharpening processing on at least data W of the four-color data R, W, G, and B of the frame memory 132 in response to a second control signal from the viewing distance determiner 138.

The viewing distance determiner 138 may determine a viewing distance mode that is pre-set by a designer using viewing distance information sensed by the viewing distance sensor 60 and output a control signal for driving any one of the blurring filter 134 and the sharpness filter 136 or shutting off driving of the blurring filter 134 and the sharpness filter 136 according to the determined viewing distance mode.

For example, the viewing distance determiner 138 may determine whether the sensed viewing distance information corresponds to any one of preset short distance mode, an optimum distance mode, and a long distance mode. Upon determining that the viewing distance corresponds to a short distance mode, the viewing distance determiner 138 may output a first control signal to drive the blurring filter 134, upon determining that the viewing distance corresponds to a long distance mode, the viewing distance determiner 138 may output a second control signal to drive the sharpness filter 136, and upon determining that the viewing distance corresponds to an optimum distance mode, the viewing distance determiner 138 may output a third control signal to shut off driving of both the blurring filter 134 and the sharpness filter 136.

The frame memory 132 may store four-color data R, W, G, and B from the four-color converter 122 in units of frames. When the viewing distance corresponds to a short distance mode, the data R, W, G, and B stored in the frame memory 132 may be corrected and then output so as to reduce brightness of an edge portion by the blurring filter 134, when the viewing distance corresponds to a long distance mode, the data R, W, G, and B may be corrected and then output so as to increase brightness of an edge portion by the sharpness filter 136, or when the viewing distance corresponds to an optimum distance mode, the data R, W, G, and B may be output via driving off of the blurring filter 134 and the sharpness filter 136 without being corrected. Accordingly, data Ro, Wo, Go, and Bo output from the frame memory 132 may include data that is selectively corrected according to a viewing distance.

The blurring filter 134 may be driven upon receiving a first control signal of a short distance mode from the viewing distance determiner 138. The driven blurring filter 134 may correct the data R, W, G, and B so as to reduce brightness of an edge portion by reading the data R, W, G, and B from the frame memory 132 and applying a blurring mask BM illustrated in FIG. 7 for each color channel and may update data of the frame memory 132 with the corrected data R, W, G, and B.

Figure 7:
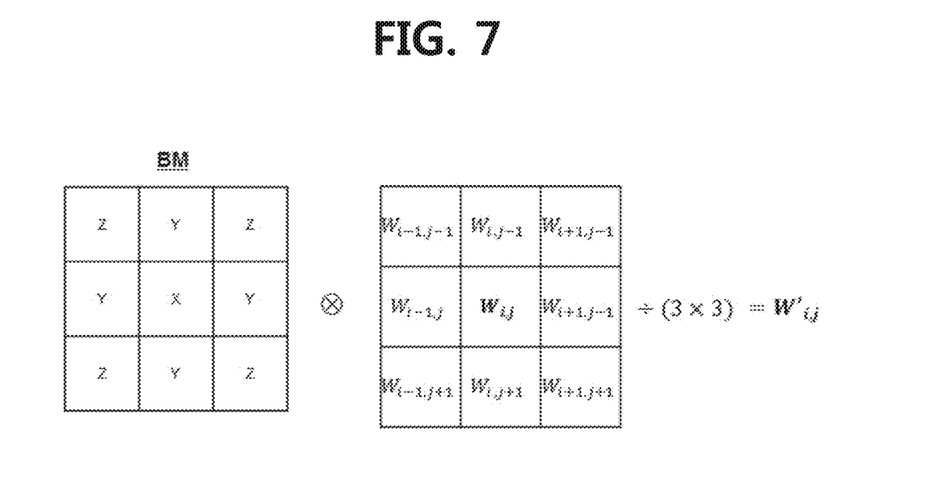
FIG. 7 is a diagram illustrating a blurring processing method of a blurring filter of FIG. 6.

In detail, the blurring filter 134 may correct data of a corresponding pixel corresponding to a central cell of the blurring mask BM as illustrated in FIG. 7 by reading the four-color data R, W, G, and B from the frame memory 132 for each color channel and applying the blurring mask BM to each color channel and may update corresponding pixel data of the frame memory 132 with the corrected data. The blurring filter 134 may repeatedly perform the aforementioned blurring processing while shifting the blurring mask BM for each color channel in units of pixels so as to update data of one frame stored in the frame memory 132.

Referring to FIG. 7, optimum correction factors (X, Y, Z) may be set to each of 3*3 cells of the blurring mask BM according to a prior experiment of a designer. That is, the correction factor X may be set to a central cell of the blurring mask BM, the correction factor Y may be set to four cells adjacent to the central cell in upward, downward, right, and left directions, and the correction factor Z may be set to four cells adjacent to the central cell in a diagonal direction. The correction factors X, Y, Z may have a positive integer less than 1 and have a relationship of X>Y>Z. For example, the correction factors X, Y, Z may have a relationship of X=1/k (k is a natural number), Y=½ k, and Z=¼ k. A size of the blurring mask BM may be varied.

The blurring mask BM may be applied to data of each of the 3*3 pixels for each color channel. FIG. 7 illustrates a representative example in which the blurring mask BM is applied to data W of data R, W, G, and B of the 3*3 pixels.

The blurring filter 134 may apply the correction factors (X, Y, Z) of the blurring mask BM to data W ($W_{i-1,j-1}$ to $W_{i+1,j+1}$) of the 3*3 pixels to perform average calculation shown in Expression 1 below. Accordingly, the data W ($W_{i,j}$) of a corresponding pixel corresponding to the central cell of the blurring mask BM may be corrected to an average value ($W'_{i,j}$) of the data W, which is obtained by applying the correction factors (X, Y, Z) of the blurring mask BM to the data W ($W_{i-1,j-1}$ to $W_{i+1,j+1}$) of nine pixels in a mask to perform average calculation.

$$W'_{i,j} = \frac{\sum_{j=j-1}^{j+1} \sum_{i=i-1}^{i+1} W_{i,j} \otimes \text{Blur filter}}{\text{filter size}} \quad \text{<Expression 1>}$$

The blurring filter 134 may also apply the blurring mask BM illustrated in FIG. 7 to the remaining data R, G, and B of the 3*3 pixels for each color channel in the same way so as to correct data R, G, and B of a corresponding central pixel (i, j) to average values (R', G', B') of data R, G, and B of pixels in a mask to which the correction factors (X, Y, Z) are applied.

Accordingly, the data R, W, G, and B of pixels corresponding to an edge portion of the data R, W, G, and B stored in the frame memory 132 may be reduced via the aforementioned blurring processing of the blurring filter 134 so as to reduce brightness of an edge portion.

The blurring filter 134 may apply the blurring mask BM only on the data W of the four-color data R, W, G, and B stored in the frame memory 132 so as to perform blurring processing only on the data W.

Upon receiving a second control signal of a long distance mode from the viewing distance determiner 138, the sharpness filter 136 may be driven. The driven sharpness filter 136 may correct the data W so as to increase brightness of an edge portion by reading only the data W of the data R, W, G, and B from the frame memory 132 and applying a sharpness mask SM illustrated in FIG. 8 and may update data of the frame memory 132 with the corrected data W. Accordingly, the sharpness filter 136 may easily and simply increase brightness of the edge portion.

Figure 8:
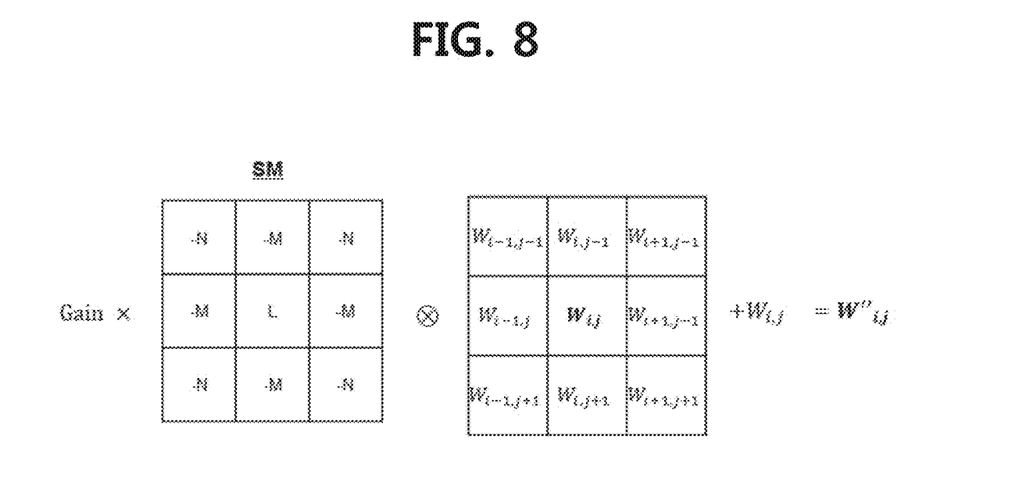
FIG. 8 is a diagram illustrating a sharpening processing method of a sharpness filter of FIG. 6.

In detail, the sharpness filter 136 may correct the data W of a corresponding pixel corresponding to a central cell of the sharpness mask SM illustrated in FIG. 8 by reading the data W from the frame memory 132 and applying the sharpness mask SM to the data W and may update the Data W of a corresponding pixel of the frame memory 132 with the corrected data W.

Referring to FIG. 8, optimum correction factors (L, −M, −N) may be set to each of 3*3 cells of the sharpness mask SM according to a prior experiment of a designer. That is, the correction factor L may be set to a central cell of the sharpness mask SM, the correction factor −M may be set to four cells adjacent to the central cell in upward, downward, right, and left directions, and the correction factor −N may be set to four cells adjacent to the central cell in a diagonal direction. Only the correction factor L of the central cell of the correction factors (L, −M, −N) may have an integer equal to or greater than 1 and the correction factors (−M, −N) of the adjacent cells may have a negative integer and have a relationship of 1>M>N>O. A size of the sharpness mask SM may be varied.

The sharpness filter 136 may apply the correction factors (L, −M, −N) of the sharpness mask SM to the data W ($W_{i-1,j-1}$ to $W_{i+1,j+1}$) of the 3*3 pixels to calculate a value obtained by summing data W to which the correction factors (L, −M, −N) of pixels in a mask are applied as shown in Expression 2 below and may add a result value obtained via product of the summed value and a sharpness gain value Gain preset by a designer to the data W ($W_{i,j}$) of a corresponding pixel corresponding to the central cell of the sharpness mask SM so as to correct the data W ($W_{i,j}$) to $W''_{i,j}$. Here, the sharpness gain value Gain may be preset by a designer according to user preference, the characteristics of a display apparatus, and so on in order to adjust a sharpening degree and may have, for example, a positive integer less than 1.

$$W''_{i,j} = \text{Gain} \times \sum_{j=j-1}^{j+1} \sum_{i=i-1}^{i+1} W_{i,j} \otimes \text{Sharpen filter} + W_{i,j} \qquad \text{<Expression 2>}$$

The sharpness filter 136 may repeatedly perform the aforementioned sharpening processing while shifting the while shifting the sharpness mask SM in units of pixels so as to update the data W of one frame stored in the frame memory 132.

Accordingly, the data W of pixels corresponding to an edge portion among the data R, W, G, and B stored in the frame memory 132 may be corrected to be increased via the aforementioned sharpness processing of the sharpness filter 136 so as to increase brightness of the edge portion.

The sharpness mask SM may be applied to each of the four-color data R, W, G, and B stored in an internal memory of the sharpness filter 136 for each color channel so as to perform sharpening processing on all of the four-color data R, W, G, and B.

Accordingly, the image processing circuit 120A according to the first embodiment of the present invention may reduce brightness of the edge portion to reduce sharpness of an image and output the image by performing blurring processing on the four-color data R, W, G, and B when a user views the image at a short distance, and image processing circuit 120A may increase the brightness of the edge portion to increase sharpness of an image and output the image by performing sharpening processing on the data W when the user views the image at a long distance. When the user views an image at an optimum distance, the four-color data R, W, G, and B may be output without the aforementioned blurring or sharpening processing.

Figure 9:
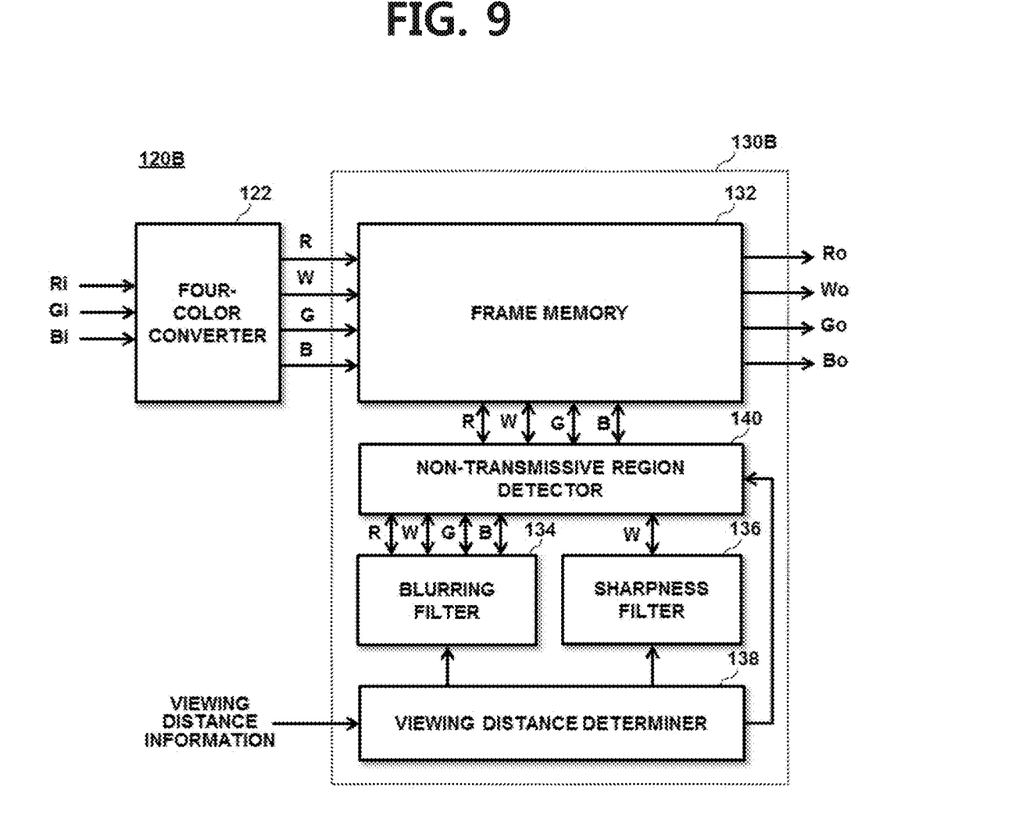
FIG. 9 is a block diagram illustrating an internal structure of the image processing circuit according to a second embodiment of the present invention.

FIG. 9 is a block diagram illustrating an internal structure of the image processing circuit 120B according to a second embodiment of the present invention.

In particular, compared with the image processing circuit 120A according to the first embodiment illustrated in FIG. 6, the image processing circuit 120B according to the second embodiment illustrated in FIG. 9 may be applied to a transparent display apparatus and may be different from the image processing circuit 120A in that a sharpness adjuster 130B is positioned between the frame memory 132, and the blurring filter 134 and the sharpness filter 136 and the image processing circuit 120B further includes a non-transmissive region detector 140, control of which is controlled by the viewing distance determiner 138. The other components are the same as in FIG. 6 and, thus, a repeated description will be omitted or briefly given.

The sharpness adjuster 130B of the image processing circuit 120B according to the second embodiment applied to a transparent display apparatus may apply a technology of dividing image data into a transmissive region and a non-transmissive region via image analysis and then adjusting sharpness according to the aforementioned viewing distance only to data of the non-transmissive region and may output data of the transmissive region without adjustment of sharpness.

In other words, data of the non-transmissive region from data stored in the frame memory 132 may be corrected so as to reduce brightness of an edge portion by the blurring filter 134 when the viewing distance corresponds to a short distance mode or corrected so as to increase the brightness of the edge portion by the sharpness filter 136 when the viewing distance corresponds to a long distance mode and, thus, the frame memory 132 may output the corrected data of the non-transmissive region and the non-corrected data of the transmissive region. When the viewing distance corresponds to an optimum distance mode, the data of the non-transmissive region may not be corrected via driving off of the blurring filter 134 and the sharpness filter 136 and, thus, the frame memory 132 may output the non-corrected data of the non-transmissive region and the transmissive region. Accordingly, data Ro, Wo, Go, and Bo output from the updated frame memory 132 may include data of the non-transmissive region that is selectively corrected according to a viewing distance and the non-corrected data of the transmissive region.

When a viewing distance corresponds to an optimum distance mode and sharpness is not necessarily adjusted, the sharpness adjuster 130B according to the second embodiment may also turn off image analysis for dividing the data R, W, G, and B stored in the frame memory 132 into a transmissive region and a non-transmissive region.

The non-transmissive region detector 140 may read and analyze the four-color data R, W, G, and B in frame units stored in the frame memory 132 and divide the data into a transmissive region and a non-transmissive region in response to a control signal indicating a viewing mode from the viewing distance determiner 138, may image-process and correct only the four-color data R, W, G, and B of the non-transmissive region by the blurring filter 134 or the sharpness filter 136 which is driven according to a viewing distance, and may update data of the non-transmissive region of the frame memory 132 to the corrected data of the non-transmissive region.

Driving of the non-transmissive region detector 140 may be turned on only when the non-transmissive region detector 140 receives a first control signal of a short distance mode and a second control signal of a long distance mode from the viewing distance determiner 138 and driving of the non-transmissive region detector 140 may be turned off when the non-transmissive region detector 140 receives a third control signal of an optimum distance mode.

The non-transmissive region detector 140 may provide the four-color data R, W, G, and B of the non-transmissive region to the blurring filter 134 so as to be updated in response to the first control signal of a short distance mode and update data of the frame memory 132 with the updated four-color data R, W, G, and B of the non-transmissive region.

The non-transmissive region detector 140 may provide only data W of the four-color data R, W, G, and B to the sharpness filter 136 so as to be updated in response to the second control signal of a long distance mode and update the frame memory 132 with the updated W data of the non-transmissive region.

Driving of the non-transmissive region detector 140 may be turned off when the non-transmissive region detector 140 receives the third control signal of an optimum distance mode.

In addition, upon receiving the first control signal of a short distance mode or the second control signal of a long distance mode from the viewing distance determiner 138, the non-transmissive region detector 140 may be driven to read four-color data R, W, G, and B from the frame memory 132, may determine the four-color data R, W, G, and B as data of a transmissive region when a gray scale of each data is greater than a specific high gray scale, e.g., 250, and may determine the four-color data R, W, G, and B as data of non-transmissive region when a gray scale of each data is smaller than the specific high gray scale. In addition, the non-transmissive region detector 140 may divide the four-color data R, W, G, and B of the frame memory 132 into a transmissive region and a non-transmissive region using other general image analysis methods.

In response to the first control signal of a short distance mode, the non-transmissive region detector 140 may provide the four-color data R, W, G, and B of the non-transmissive region read from the frame memory 132 to the blurring filter 134. The blurring filter 134 driven in response to the first control signal of a short distance mode may correct the four-color data R, W, G, and B of the non-transmissive region provided from the non-transmissive region detector 140 by applying the blurring mask BM for each color channel, as described above. The non-transmissive region detector 140 may update corresponding data items of the frame memory 132 to the four-color data R, W, G, and B of the non-transmissive region that is corrected by the blurring filter 134.

Figure 10:
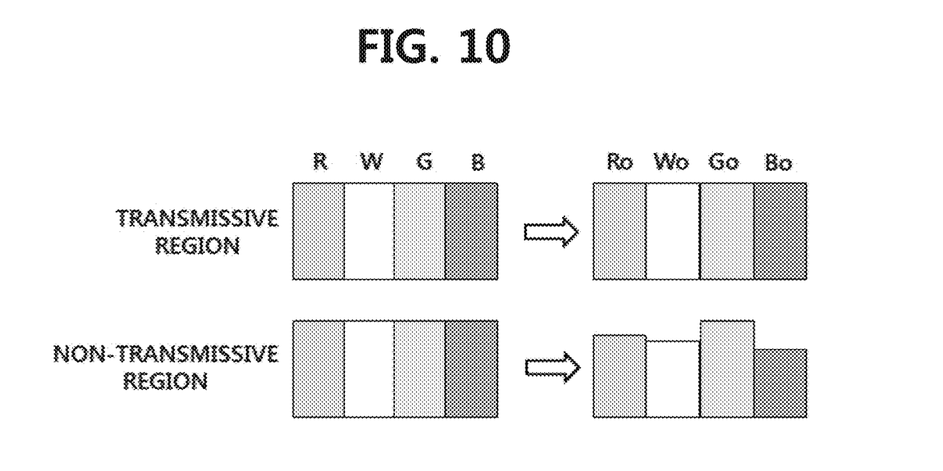
FIG. 10 is a diagram illustrating an example of an image processing result in a short distance mode of an image processing circuit illustrated in FIG. 9.

Accordingly, when a user views an image at a short distance, the frame memory 132 may output the four-color data Ro, Wo, Go, and Bo of the non-transmissive region corrected to reduce brightness of an edge portion via blurring processing and non-corrected four-color data Ro, Wo, Go, and Bo of a transmissive region, as illustrated in FIG. 10.

In response to the second control signal of a long distance mode, the non-transmissive region detector 140 may provide the data W of the four-color data R, W, G, and B of the non-transmissive region read from the frame memory 132 to the sharpness filter 136. The sharpness filter 136 driven in response to the second control signal of a long distance mode may correct the data W of the non-transmissive region provided from the non-transmissive region detector 140 by applying the sharpness mask SM, as described above. The non-transmissive region detector 140 may update the corresponding data W of the frame memory 132 with the data W of the non-transmissive region corrected by the sharpness filter 136.

Figure 11:
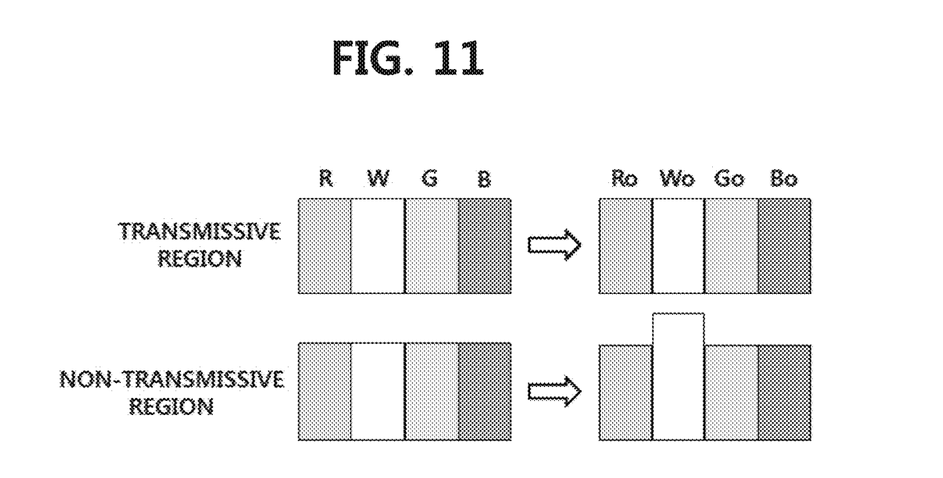
FIG. 11 is a diagram illustrating an example of a sharpening processing result in a long distance mode of the image processing circuit illustrated in FIG. 9.

Accordingly, when a user views an image at a short distance, the frame memory 132 may output the data W corrected to increase brightness of an edge portion via sharpening processing, non-corrected data R, and non-corrected four-color data Ro, Wo, Go, and Bo of a transmissive region, as illustrated in FIG. 11.

On the other hand, when the third control signal of an optimum distance mode is input, driving of all of the blurring filter 134, the sharpness filter 136, and the non-transmissive region detector 140 is turned off.

Accordingly, the frame memory 132 may output non-corrected four-color data Ro, Wo, Go, and Bo of the transmissive region and non-transmissive region.

Accordingly, the image processing circuit 120B according to the second embodiment of the present invention may reduce brightness of the edge portion to reduce sharpness of an image and output the image by performing blurring processing on the four-color data R, W, G, and B of the non-transmissive region when a user views the image at a short distance, and the image processing circuit 120B may increase the brightness of the edge portion to increase sharpness of an image and output the image by performing sharpening processing on the data W of the non-transmissive region when the user views the image at a long distance. When the user views an image at an optimum distance, the four-color data R, W, G, and B may be output without the aforementioned blurring or sharpening processing.

Figure 12:
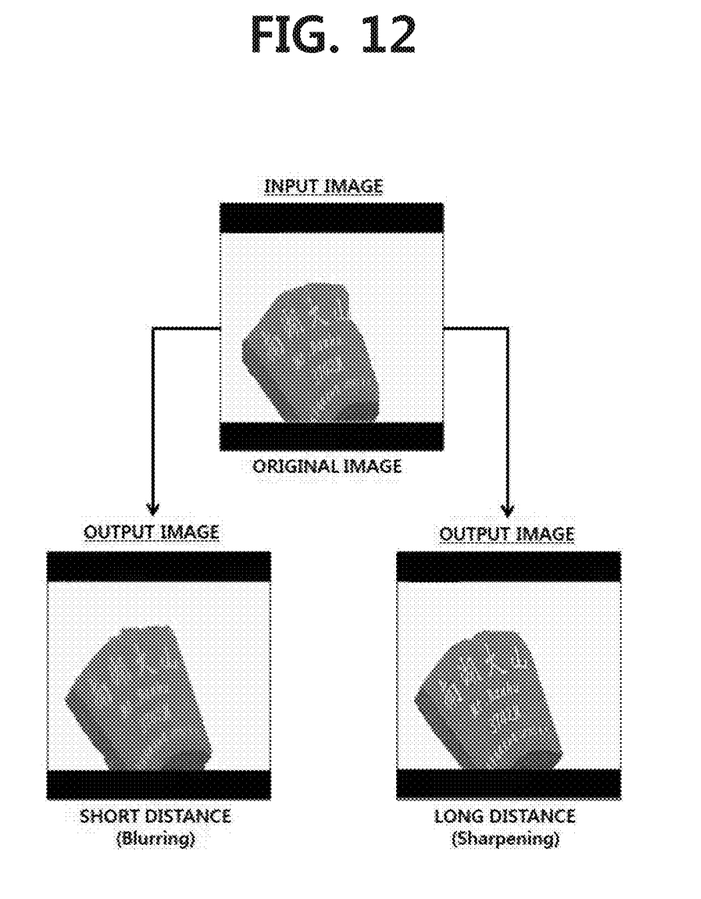
FIG. 12 is a set of images as examples of an output image of a short distance mode and an output image of a long distance mode compared with an input image of a transparent display apparatus according to the present invention.

FIG. 12 is a set of images as examples of an output image of a short distance mode and an output image of a long distance mode compared with an input image of a transparent display apparatus to which the image processing circuit 120B according to the second embodiment illustrated in FIG. 9 is applied.

As seen from FIG. 12, by virtue of the aforementioned image processing circuit 120B according to the second embodiment, brightness of an edge portion of a letter in a non-transmissive region of the output image of a short distance mode is reduced to reduce sharpness and brightness of an edge portion of a letter in a non-transmissive region of the output image of a long distance mode is increased to increase sharpness.

As described above, the display apparatus according to the present invention may reduce brightness of an edge portion to reduce a pixel recognition degree via blurring processing when a viewing distance corresponds to a short distance mode and may increase the brightness of the edge portion to increase sharpness via sharpening processing when the viewing distance corresponds to a long distance mode, thereby providing optimum recognizing image quality to the user according to a viewing distance.

In particular, a transparent display apparatus according to the present invention may perform blurring processing or sharpening processing only on a non-transmissive region according to a viewing distance via image analysis so as to prevent transmittance of the transmissive region from being reduced due to image processing as well as to enhance user recognition image quality.

A display apparatus according to the present invention may reduce brightness of an edge portion to reduce a pixel recognition degree via blurring processing when a viewing distance corresponds to a short distance mode and may increase the brightness of the edge portion to increase sharpness via sharpening processing when the viewing distance corresponds to a long distance mode, thereby providing optimum recognizing image quality to the user according to a viewing distance.

In particular, the display apparatus according to the present invention may perform blurring processing or sharpening processing only on a non-transmissive region according to a viewing distance via image analysis so as to prevent transmittance of the transmissive region from being reduced due to image processing as well as to enhance user recognition image quality.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An image processing method comprising:
   sensing a viewing distance of a user and determining a predetermined viewing distance mode;
   upon determining that the viewing distance corresponds to a short distance mode, performing blurring processing on four-color data of each pixel of an input image for each color channel by applying a predetermined blurring mask to reduce data of an edge portion of the input image and to output the image;
   upon determining that the viewing distance corresponds to a long distance mode, performing sharpening processing on white data (W data) of four-color data of each pixel of the input image by applying a predetermined sharpness mask to increase the W data of the edge portion of the input image and to output the image; and prior to the performing of the blurring or sharpening processing, converting three-color data of each pixel of the input image into the four-color data, storing the four-color data in a memory in units of frames, and dividing the four-color data into a transmissive region and a non-transmissive region by performing predetermined image analysis on the four-color data stored in the memory, wherein:
the performing of the blurring processing comprises updating the four-color data of the non-transmissive region via the blurring processing and outputting the four-color data of the transmissive region and the updated four-color data of the non-transmissive region; and the performing of the sharpening processing comprises updating the W data of the four-color data of the non-transmissive region via the sharpening processing and outputting the four-color data of the transmissive region and the four-color data of the non-transmissive region containing the updated W data.

2. The image processing method according to claim 1, further comprising, upon determining that the viewing distance corresponds to an optimum distance mode, outputting the four-color data stored in the memory without the blurring processing or the sharpening processing.

3. An image processing circuit for performing image processing according to a viewing distance of a user, sensed by an external viewing distance sensor, the image processing circuit comprising:
a viewing distance determiner for determining a predetermined viewing distance mode according to the viewing distance sensed by the viewing distance sensor;
a blurring filter for performing blurring processing on four-color data of each pixel of an input image for each color channel by applying a predetermined blurring mask to correct data of an edge portion of the input image when the viewing distance determiner outputs a first control signal indicating a short distance mode;
a sharpness filter for performing sharpening processing on white data (W data) of the four-color data of each pixel of the input image by applying a predetermined sharpness mask to correct the W data of the edge portion of the input image when the viewing distance determiner outputs a second control signal indicating a long distance mode;
a four-color converter for converting three-color data of each pixel of the input image into the four-color data;
a memory for storing the four-color data from the four-color converter in units of frames; and
a non-transmissive region detector connected between the memory, and the blurring filter and the sharpness filter and for dividing the four-color data stored in the memory into a transmissive region and a non-transmissive region by performing image analysis on the four-color data,
wherein the non-transmissive region detector provides the four-color data of the non-transmissive region to the blurring filter in response to the first control signal from the viewing distance determiner and updates the corresponding four-color data of the memory with the four-color data of the non-transmissive region corrected by the blurring filter, and provides the W data of the four-color data of the non-transmissive region to the sharpness filter in response to the second control signal from the viewing distance determiner and updates the corresponding W data of the memory with the W data of the non-transmissive region corrected by the sharpness filter.

4. The image processing circuit according to claim 3, wherein driving of the blurring filter and the sharpness filter is turned off when the viewing distance determiner outputs a third control signal indicating an optimum distance mode.

5. The image processing circuit according to claim 3, wherein driving of the blurring filter, the sharpness filter, and the non-transmissive region detector is turned off when the viewing distance determiner outputs a third control signal indicating an optimum distance mode.

6. A display apparatus comprising:
a viewing distance sensor for sensing a viewing distance of a user;
an image processing circuit for selectively performing blurring processing and sharpening processing according to the viewing distance of the user; and
a panel driver for driving a display panel to display four-color data output from the image processing circuit on the display panel,
the image processing circuit comprising:
a viewing distance determiner for determining a predetermined viewing distance mode according to the viewing distance sensed by the viewing distance sensor;
a blurring filter for performing blurring processing on the four-color data of each pixel of an input image for each color channel by applying a predetermined blurring mask to correct data of an edge portion of the input image when the viewing distance determiner outputs a first control signal indicating a short distance mode;
a sharpness filter for performing sharpening processing on white data (W data) of the four-color data of each pixel of the input image by applying a predetermined sharpness mask to correct the W data of the edge portion of the input image when the viewing distance determiner outputs a second control signal indicating a long distance mode;
a four-color converter for converting three-color data of each pixel of the input image into the four-color data;
a memory for storing the four-color data from the four-color converter in units of frames; and
a non-transmissive region detector connected between the memory, and the blurring filter and the sharpness filter and for dividing the four-color data stored in the memory into a transmissive region and a non-transmissive region by performing image analysis on the four-color data,
wherein the non-transmissive region detector provides the four-color data of the non-transmissive region to the blurring filter in response to the first control signal from the viewing distance determiner and updates the corresponding four-color data of the memory with the four-color data of the non-transmissive region corrected by the blurring filter, and provides the W data of the four-color data of the non-transmissive region to the sharpness filter in response to the second control signal from the viewing distance determiner and updates the corresponding W data of the memory with the W data of the non-transmissive region corrected by the sharpness filter.

7. The display apparatus according to claim 6, wherein driving of the blurring filter and the sharpness filter is turned off when the viewing distance determiner outputs a third control signal indicating an optimum distance mode.

8. The display apparatus according to claim 6, wherein driving of the blurring filter, the sharpness filter, and the non-transmissive region detector is turned off when the viewing distance determiner outputs a third control signal indicating an optimum distance mode.

* * * * *